United States Patent
Smashey

(10) Patent No.: US 6,539,620 B1
(45) Date of Patent: Apr. 1, 2003

(54) METHOD OF MANUFACTURING SUPERALLOY WELD WIRE

(75) Inventor: Russell W. Smashey, Batavia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/487,282

(22) Filed: Jan. 19, 2000

(51) Int. Cl.$^7$ ................................................ H01R 43/00
(52) U.S. Cl. .......................... 29/825; 29/419.1; 29/423; 29/868
(58) Field of Search .......................... 29/825, 868, 869, 29/419.1, 423

(56) References Cited

U.S. PATENT DOCUMENTS

| | | | |
|---|---|---|---|
| 3,944,416 A | * | 3/1976 | Walter |
| 4,055,447 A | * | 10/1977 | Jackson |
| 4,209,122 A | * | 6/1980 | Hunt |
| 4,323,186 A | | 4/1982 | Hunt ........................ 228/173 E |
| 4,777,710 A | | 10/1988 | Hunt ........................... 29/419.1 |
| 5,154,884 A | * | 10/1992 | Wukusick et al. |
| 5,922,148 A | * | 7/1999 | Irvine et al. |
| 6,036,791 A | * | 3/2000 | Mitsuhashi et al. |

* cited by examiner

*Primary Examiner*—Carl J. Arbes
(74) *Attorney, Agent, or Firm*—David L. Narciso; McNees, Wallace & Nurick

(57) ABSTRACT

A method for producing superalloy weld wire and weld wire having fewer inclusions, and specifically fewer hafnia inclusions, and superalloy weld wire, particularly hafnium-containing superalloy weld wire, produced by this method. The method includes producing directionally solidified cast rod in a diameter of less than about ½ inch. The rod preferably is produced by investment casting or by continuous casting. The directional solidification process results in rod having inclusions such as oxides and dirt segregated into portions of the casting where they are easily removed. The cast rod can then be formed into semi-finished weld wire using a single extrusion step, followed by grinding to the final required diameter.

13 Claims, No Drawings

METHOD OF MANUFACTURING SUPERALLOY WELD WIRE

FIELD OF THE INVENTION

This invention generally is directed to a method for manufacturing weld wire having reduced inclusions and specifically at a method for producing superalloy weld wire for use in repair of superalloy articles for which inclusion control is important.

BACKGROUND OF THE INVENTION

Superalloy weld wire used for welding superalloy components is available commercially, but has been found prone to oxide inclusions. It was determined that these oxide inclusions were directly related to the method of producing the wire. Oxide inclusions are undesirable because they are transferred from the weld wire to the work piece during welding operations. Unless the welder is very skilled, the inclusions are incorporated into the weld. The non-metallic inclusion in the weld is an undesirable discontinuity in an otherwise continuous metallic matrix, and, in the worst case, can lead to a crack.

Weld wire is manufactured by casting superalloy material into cast ingot in the form of pipe with an equiaxed grain structure having a diameter of about one inch. The casting operation produces standard and well-known casting defects that have been transferred to the weld wire, which, up until now, have been accepted as inherent in the process of producing the weld wire. Casting involves melting metal of the desired composition and placing it into a mold of preselected shape where heat is withdrawn. For weld wire, the superalloy metal is cast into pipe using metal molds. The solidification process progresses as heat is extracted from the mold surface. As the heat is extracted, small crystals begin to form at the mold wall and grow as a substantially equiaxed-grain structure. As the metal transforms from liquid to solid at the solidification interface, shrinkage results from the solid metal occupying less volume than the liquid metal. This shrinkage is not a problem, so long as molten metal is available to supply metal to the area of shrinkage. The cylindrical molds currently used to produce the castings for the weld wire have a solidification interface that advances from the inner surface of the mold into the molten metal as heat is extracted outwardly through the mold wall. If the solidification interface progresses radially completely across the cylindrical pipe-like molds used for weld wire before the molten metal below it has solidified, then feed metal is prevented from reaching this portion of the casting. Thus, as this molten metal freezes, there is no path for additional molten metal to feed the region, and shrinkage cavities result. It has been found that undesirable inclusions, such as oxide inclusions and other impurities, float to the surface of molten metal during solidification into ingot where they can be removed. When the feed path for molten metal is closed, not only is there no path for supplying additional molten metal to compensate for shrinkage, but there is no path to allow the inclusions to float to the surface of the mold. The result is that these areas of shrinkage, which when extensive are referred to as pipe, or which appear as localized areas of porosity, also act as collector areas for oxide inclusions, dirt or other impurities formed during the solidification process. Once the porosity and the associated non-metallic inclusions are formed within the casting, there is no practical way to remove them. The casting is then removed from the mold, typically by grinding.

The pipe typically is cut into standard lengths of 25 inches and "canned." There is no restriction on the length into which the pipe is cut, the length being limited as a function of the size and capability of the extrusion press. Canning entails placing a plurality of one inch diameter bars in a can with an inert oxide, such as alumina oxide or silica, and sealing the can shut by vacuum welding or electron beam welding. The "canned" pipe is extruded into rod having a diameter of ¼ inch, and the canning is removed from the surface. Defects, inclusions and dimensional variations are then ground from the exterior of the rod. Of course, since only inclusions on the exterior are removed, internal inclusions are extruded along the axial length of the ¼ inch rod. The extrusion cycle is then repeated by drawing standard 25 inch lengths of ¼ inch canned wire to the required diameter of about 0.042 inches to about 0.045 inches, the inclusions having been further extruded in the axial direction.

Because most oxides that result in inclusions formed during the solidification process melt at temperatures significantly higher than the melting temperatures of the superalloy metal, the oxides do not dissociate during the welding. In fact, certain superalloy compositions, such as Rene' 142, include hafnium, which, upon oxidation forms hafnia, one of the most stable oxides known. Only the most skilled of welders can prevent this oxide from being entrapped in a weldment, such as repaired tip of a superalloy turbine blade.

What is needed is a method of producing superalloy weld wire that has reduced non-metallic inclusions, so that weldments produced by such weld wire result in cleaner welds containing fewer non-metallic inclusions, thereby resulting in fewer rework cycles and lower repair costs.

SUMMARY OF THE INVENTION

Improvements in manufacturing technology and materials are the keys to increased performance and reduced costs for many articles. As an example, continuing and often interrelated improvements in processes and materials have resulted in reduced costs and reduced repair cycles for parts used in aircraft gas turbine engines. The present invention is one such improvement. A method for producing weld wire having low inclusion content is set forth. The method includes casting a molten metal alloy of a preselected composition. The casting is accomplished in a mold having at least one ingot cavity that is shaped in a rod size of a preselected diameter. The molten metal filling the rod-shaped ingot can then be directionally solidified by conventional directional solidification technology. The directional solidification permits control of the solid/liquid metal interface, so that heat constantly is withdrawn away from the advancing interface as columnar grains grow by advancing into the liquid interface. This method of solidification substantially eliminates the formation of shrinkage cavities and porosity. Also, because the columnar grains grow by advancing into the molten metal, impurities such as oxides and dirt are pushed away from the advancing grains and are not trapped within the ingot as it solidifies. The impurities in the form of oxides, dirt and other non-metallic inclusions gather in the last portion of the ingot to solidify, so that they can readily be removed.

After the rod-shaped castings have solidified and the region containing the impurities has been removed, they can optionally be arranged into a plurality of preselected equal lengths. The rods are then placed into a container of malleable metal. Because the container is disposable, it is typically made from an inexpensive material such as steel. The remaining volume of the container is occupied by an inert material that will not affect the rods during subsequent mechanical processing. The filled container is then sealed by placing a cap on it, which is welded in place.

The filled container is then extruded to a preselected diameter in a conventional manner for manufacturing weld wire. The weld wire is removed from the container, typically by destroying the extruded container by grinding.

An advantage of the present invention is that weld wire made in accordance with the present invention has improved cleanliness, the impurities associated with oxide inclusions, shrinkage, dirt and other non-metallic inclusions being substantially reduced or eliminated. Because these impurities are always transferred to the weld pool during welding operations, there is a reduced tendency for the structures being welded to incorporate these impurities. These impurities, when present in sufficient amounts, can form defects and even lead to cracking. Thus, welds made using weld wire of the present invention do not require exceptional skill to accomplish and require less repairs.

Another advantage of the present invention is that weld wire made in accordance with the present invention has a more homogenous chemical composition. This eliminates problems associated with segregation, such as cracking due to localized embrittlement induced by mechanical working without a homogenization heat treatment. Also, a more homogenous composition is desirable as weld metal is deposited on the workpiece.

Still another advantage of weld wire made in accordance with the present invention is that it can be made more cheaply and with a higher yield than prior art weld wire. Even though the casting and directional solidification methods are more costly, the costs are more than offset since the material can be cast to a preselected rod size, allowing at least one extrusion operation to be eliminated. In addition, the grinding operation associated with removal of the can after extruding typically results in grinding of at least some of the weld wire. Since at least one grinding operation is eliminated, yield is improved.

Finally, the rods are directionally solidified so that the columnar grains are aligned along the rod axis, which is also the most ductile direction. Because this is also the direction of the extrusion operation, the wire is easier to extrude into longer lengths with less breakage during the extrusion process.

Other features and advantages of the present invention will be apparent from the following more detailed description of the preferred embodiments which illustrate, by way of example, the principles of the invention.

DESCRIPTION OF THE PREFERRED EMBODIMENTS

Welding of superalloy articles, such as turbine blade tip repairs, requires exceptional cleanliness. The portion of an article such as a turbine blade tip that is repaired is very small, so that even small inclusions can result in a defect that requires removal and repair. In a more extreme case, the inclusion can lead to a crack. In the worst case, the inclusion may go undetected, and the blade may be reinstalled in the gas turbine. The inclusion may lead to a premature blade failure. One of the more troubling inclusions is hafnia, formed as hafnium reacts with oxygen.

There has been an on-going industry effort to produce weld wire that is as clean as possible. Any inclusions that are present in the weld wire, such as oxide inclusions and dirt, ultimately are incorporated into the weld puddle as the weld metal is fed into the molten metal. Only the most skilled welders are able to detect the inclusions, particularly hafnia, that are in the puddle and float such inclusion to the surface of the puddle for removal. Most of the welders lack this skill level, thus the inclusions are often fused into the metal as it solidifies. Most of the inclusions are detected by nondestructive testing and removed, although a few go undetected. It is recognized that despite the most careful procedures utilized, the processes currently used in manufacturing superalloy weld wire inherently result in inclusions. It was found that the inclusions are present very early in the manufacturing sequence, during the original casting of the weld metal. Subsequent processing only causes the inclusions to be strung out in the axial direction of the weld wire as the cast superalloy material is extruded into weld wire.

Efforts to improve the quality of the weld wire used in superalloy welding clearly must initiate in the casting cycle. The efforts that generally can produce cleaner castings and, in particular, castings in which any hafnia formed during the casting operation can be removed to areas of the casting in which the hafnia can be readily detected and easily removed have not been implemented in the superalloy welding area. Although the initial costs of production are significantly higher to produce the clean cast material that ultimately results in clean weld wire, the advantage provided to the manufacturer of the wire is fewer manufacturing steps and higher weld wire yield, while the advantage to the end user of the weld material is a more reliable part produced with less rework and higher repair yields. In addition, the skill of the welder in avoiding defects is not as important a consideration with clean weld wire. While the technology to produce clean castings that are substantially defect free has been available, it has not been applied to the simple rod shapes used as the starting material for superalloy weld wire. Such clean casting technology has been reserved for producing intricate castings such as turbine blades. These articles are very expensive, being produced by investment casting, also referred to as lost wax.

Weld wire produced in accordance with the present invention, like virtually all metal, is ultimately cast. To simplify subsequent processing, the material is cast into the shape of a rod that is larger than the ultimate diameter of the weld wire. Although the cast rod may be any convenient size, the rod of the present invention is cast into a diameter of less than about ½ inch, and preferably into a diameter of about ¼ inch.

A directional solidification process has been found to be most effective in minimizing or reducing defects in the cast rod. This is a corollary benefit of directional solidification, which is usually used to impart a preferred grain orientation on an article for a variety of reasons. Directional solidification is well-known and is accomplished by withdrawing heat from the mold containing the molten metal from one direction, typically by use of a heat removal device, frequently water-cooled, referred to as a chill. Since the solidification is controlled in the direction opposite heat removal by the chill, the last region in the rod-shaped ingot to solidify will be the area opposite the chill through which heat is withdrawn. The metal, on solidifying, contracts, because solid metal occupies less volume than liquid metal. However, this controlled method of heat removal allows molten metal to continually feed the advancing solidification interface as columnar grains advance or grow into the remaining molten metal, so that defects due to shrinkage can substantially be eliminated. In addition, since impurities that can lead to defects, such as dirt and oxides, are lighter than the liquid metal, they have a tendency to float to the surface of the liquid metal. Because of the method of solidification, it is significantly less likely that these impurities will be trapped within the cast material. Instead, these impurities, which include non-metallic oxides, dirt, and any other contamination, will float to the top of the molten metal and be trapped in the last portion of metal to solidify. This portion of metal can subsequently be removed as scrap.

Processes for producing directionally solidified articles include investment casting and continuous casting. Prior to this invention, neither of these have been utilized to cast superalloy rod material that can ultimately be extruded into weld rod. Cluster molds for investment casting can be made so that a plurality of rods, at least four, preferably about ¼ inch diameter, can be cast. Preferably the length of each rod is about 25 inches so that presently available extrusion equipment can be used. Because the rods will be subsequently mechanically worked into weld wire, there is no grain size requirement. The requirement for the rod only is that it be directionally solidified in a manner to cause impurities to float to the top and sides of the mold. Continuous casting can also be utilized, although no superalloy rod has been produced in the size range of less than ½ inch, and preferably about ¼ inch in diameter, and subsequently mechanically worked into superalloy weld wire, technologically, there are no known physical limitations for producing superalloy rod in this size range using well-known principles of continuous casting. Briefly, continuous casting involves gradually and continuously withdrawing a rod-shaped ingot from one end of a mold having the ability to continuously withdraw heat, such as a water-cooled mold, while molten metal is fed continuously into the opposite end of the mold. Although the initial investment in equipment and set-up would be considerable, the cost of producing continuous cast rod in production quantities could be accomplished at considerable savings over investment castings, and continuous casting can produce an even greater yield of rod material than investment casting.

After completion of the solidification process and removal of any portions of the rod-shaped ingot that contain impurities, the rod-shaped ingot is cut into preselected lengths, if required. Typically, these lengths are about two feet to about 25 inches in length. The rod-shaped ingot is then processed in a manner similar to prior art weld wire after it has been extruded to a diameter of about ¼ inch. However, the rod-shaped ingot of the present invention, because it is cast directly to a diameter of ¼ inch, eliminates the prior art extrusion step of canning and reducing pipe from a size of about 1 inch in diameter to a size of ¼ inch in diameter. Also, because the prior art method requires removal of the can by grinding, which results in loss of some of the stock material used for weld wire, the present invention improves yield.

The rod-shaped ingot is placed into a malleable container, preferably a steel container. The container is filled with an inert oxide, preferably silica or alumina, and extruded to the final diameter. This extrusion step can produce weld wire of any diameter, from 0.015 inches to 0.100 inches. However, the rod is extruded to a size slightly larger than the required final diameter, which is usually in the range of about 0.040–0.050 inches and preferably in the range of 0.042–0.045 inches. After the extrusion operation, the container or canning is split and the weld wire is peeled away. An operator separates the wire from the canning. The slightly larger diameter is required since the wire must be ground to remove surface impurities and imperfections, as well as dimensional deviations that can result from extrusion and flat spots. Some weld stock material thus is lost in the grinding process to achieve the final diameter.

While the process of the present invention can be utilized to produce clean weld metal for any alloy, there is no benefit for ferrous alloys which, for a variety of reasons, are produced cheaply and cleanly, and which can utilize fluxes to assist in maintaining cleanliness. The present invention is most beneficial in producing clean superalloy weld wire. As discussed above, the conventional solidification techniques used to produce the starting material for superalloy weld wire inherently tends to trap impurities. Contributing to this problem is that superalloy compositions contain many elements that are prone to oxidize, such as aluminum and hafnium. Once formed, these oxides do not dissociate, and if trapped in the casting, create problems during welding. For example, hafnium oxide, hafnia, is one of the most stable oxides known. Once entrapped in weld rod, it will wind up in the weld pool, and only the most experienced welders will be able to float it from a turbine tip repair. If it is not removed, a crack may be initiated from the hafnia if it is large enough. Even if it does not form a crack, it will result in a non-metallic inclusion that must be removed and repaired, a costly and time-consuming but preventable cycle.

The present invention has been implemented for producing weld wire from superalloys having a face-centered cubic crystal ("FCC") structure. The advantage for FCC structures is evident because the directional solidification results in columnar grains being formed roughly parallel to the rod axis so that the <100> crystallographic direction is aligned with the rod axis. Beneficially, the <100> crystallographic direction is also the direction of maximum ductility for the FCC structure, the most embrittled region being along the grain boundaries. As a result, the subsequent extrusion cycle is performed in the direction of maximum ductility, so that extrusion is not only easier, but less cracking of the weld wire occurs during the extrusion process, resulting in higher yield. It is useful for cobalt-based superalloys and nickel-based superalloys. This process is particularly useful for producing weld wire that contains elements that readily form oxides such as hafnium and aluminum. One such alloy is Rene' 142, having a nominal composition in weight percent of about 0.12% C, about 0.1% Mn, about 6.8% Cr, about 0.2% Fe, about 0.015% B, about 12% Co, about 6.15% Al, about 4.9% W, about 1.5% Mo, about 6.35% Ta, about 1.5% Hf, about 2.8% Re and the balance Ni and incidental impurities. A complete description of Rene' 142 is found in U.S. Pat. No. 5,173,255, assigned to the assignee of the present invention and incorporated herein by reference. Rene' 142 has a broad composition, in weight percent of about 0.1–0.15% C, about 0.3–2% Hf, about 11–14% Co, about 5–9% Ta, about 5–10% Cr, about 0.5–3% Mo, about 4–7% W, about 5–7% Al, about 1.5–4% Re, about 0.005–0.03% B, optionally Cb to about 0.5%, optionally Y to about 0.5%, the substantial absence of Zr, Ti and V and the balance Ni and incidental impurities. The preferred composition of this alloy is, in weight percent of about 0.1–0.14% C, about 1.30–1.70% Hf, about 11.45–12.05% Co, about 6.20–6.50% Ta, about 6.60–7.00% Cr, about 1.30–1.70% Mo, about 4.7–5.10% W, about 5.94–6.307% Al, about 2.60–3.00% Re, about 0.01–0.02% B, up to 0.03% Zr (max.), up to 0.01% V (max.), up to 0.10% Cb (max.), up to 0.02% Ti (max), up to about 0.5% Y and the balance Ni and incidental impurities.

An experiment was conducted wherein 116 turbine blades were repaired using Rene' 142 weld wire manufactured in accordance with the present invention. Two welders were selected to perform the welding; one welder was a very skilled welder who had a yield rate of 91% using prior art weld wire; and the other welder was a welder of average skill who had a yield rate of about 60–70% using prior art weld wire. Yield rate refers to the number of turbine blade tips repaired without requiring rework to remove weld defects. The skilled welder improved his yield rate from 91% to about 94%. Surprisingly, the welder of average skill improved his yield rate to about 90–91%. The weld wire of the present invention, in addition to being less expensive to produce, results in significantly lower costs to the end user as repair yields are significantly improved and the pool of available welders to produce the improved yields is significantly expanded.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method of producing weld wire having low inclusion content, comprising the steps of:

casting a molten superalloy having a preselected composition into a mold having at least one ingot cavity in the shape of a rod having a diameter of less than about ½ inch;

directionally solidifying the rod-shaped ingot by feeding an advancing solidification interface with molten metal to eliminate creation of shrinkage cavities and simultaneously causing impurities and inclusions to segregate as slag to the top and sides of the ingot during solidification, while growing grains into the molten metal substantially parallel to the axial direction of the rod-shaped ingot;

following completion of solidification, removing a portion of the rod-shaped ingot having inclusions and impurities;

cutting the rod-shaped ingot into a plurality of preselected lengths;

placing a plurality the preselected cut lengths of rod into a container;

filling the remaining volume of the container with an inert oxide;

capping the container;

sealing the capped container;

extruding the rod-filled container so as to form wire for welding having a preselected diameter; and removing the wire from the container.

2. The method of claim 1 wherein the step of casting a superalloy into a mold includes casting the superalloy by investment casting.

3. The method of claim 2 wherein the step of investment casting includes casting a plurality of superalloy rods in a mold.

4. The method of claim 1 wherein the superalloy is continuously cast.

5. The method of claim 1 wherein the preselected superalloy is selected from the group consisting of nickel-based superalloys and cobalt-based superalloys.

6. The method of claim 5 wherein the selected superalloy includes hafnium.

7. The method of claim 6 wherein the selected superalloy is Rene' 142 having a nominal composition in weight percent of about 0.12% C, about 0.1% Mn, about 6.8% Cr, about 0.2% Fe, about 0.015% B, about 12% Co, about 6.15% Al, about 4.9% W, about 1.5% Mo, about 6.35% Ta, about 1.5% Ht, about 2.8% Re and the balance Ni and incidental impurities.

8. The method of claim 5 wherein the step of directionally solidifying the rod-shaped ingot includes solidifying the ingot so the <100> crystallographic direction is aligned in the direction of the weld axis.

9. The method of claim 8 wherein the step of extruding includes extruding the rod-shaped ingot in the <100> crystallographic direction.

10. The method of claim 1 wherein the step of filling the volume of the container with an inert oxide additionally includes selecting an inert oxide from the group consisting of alumina and silica.

11. The method of claim 1 wherein the step of cutting the rod-shaped ingot into lengths of about 25 inches.

12. The method of claim 1 wherein the preselected diameter is about ¼ inch.

13. The method of claim 1 wherein the weld wire is extruded to a diameter in the range of 0.040–0.050 inches.

* * * * *